3,031,460
PREPARATION OF DERIVATIVES OF BENZOTHIOPHENE

Franz Marschall, Easton, Pa., assignor to General Aniline & Film Corporation, New York, N.Y., a corporation of Delaware
No Drawing. Filed Apr. 23, 1956, Ser. No. 579,724
5 Claims. (Cl. 260—329.3)

This invention relates to the preparation of benzothiophene derivatives. More particularly, this invention relates to a novel process for the production of sulfonated 3,7-diaminodibenzothiophenedioxides, i.e. sulfonated compounds containing the nucleus

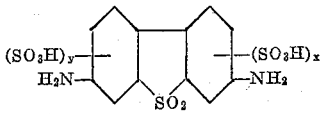

where $x$ is an integer which is 1 and $y$ is an integer which is 0 or 1.

Sulfonated 3,7-diaminodibenzothiophenedioxides, which are employed as brighteners for certain textile materials, have heretofore been prepared by treating benzidine or 3,7-diaminobenzothiophenedioxide with 100% sulfuric acid or oleum at temperatures up to 150° C. Such prior process yielded a number of products ranging from 3,7-diaminodibenzothiophenedioxide to its mono- and disulfonic acids as well as products having a greater number of sulfonic acid groups which are hereinafter referred to as polysulfonic acids. All of these products are normally present at the same time and must be separated.

The polysulfonic acid products are of substantially no value as intermediates in the preparation of brighteners, while the 3,7-diaminobenzothiophenedioxide mono- and disulfonic acids give the most valuable brighteners.

It is an important object of this invention to provide an improved process for the preparation of mono- or di-sulfonated 3,7-diaminodibenzothiophenedioxides.

Other objects and advantages of this invention will appear from the following detailed description and claims.

I have found that, by heating the di-sulfate salt of a diaminodibenzothiophenedioxide at a temperature of about 170 to 230° C., there is readily produced a mixture of the corresponding mono- and disulfonic acids in high purity and good yield and with substantially no production of any polysulfonic acids. Therefore, the mixtures of said mono- and disulfonic acids produced in accordance with this invention may be employed for the direct production of brighteners thereby obviating the necessity of employing the expensive procedures usually required for separating the 3,7-diaminodibenzothiophenedioxide mono- and disulfonic acids from mixtures containing said sulfonic acids and 3,7-diaminodibenzothiophenedioxide polysulfonic acids, which latter mixtures are produced when benzidine or 3,7-diaminodibenzothiophenedioxide is sulfonated using oleum at temperatures up to about 150° C.

The process of the instant invention is not only useful for the preparation of 3,7-diaminodibenzophenedioxide mono- and disulfonic acids, but also for the preparation of the mono-, di-, tri- and tetra-substituted lower alkyl such as methyl and ethyl, lower alkoxy such as methoxy and ethoxy, and halogen such as chloro and bromo, derivatives thereof, in which derivatives there is at least one free position in each benzene nucleus available for sulfonation. In order to obtain optimum results, it is preferred that the disulfonated derivatives of 3,7-diaminodibenzothiophenedioxide in the mixture of 3,7-diaminodibenzophenedioxides produced in accordance with the instant invention contain a sulfonic acid radical substituted in each benzene nucleus since said disulfonated derivatives are useful in producing a species of brightener possessing outstanding properties.

The di-sulfate salts of 3,7-diaminodibenzothiophenedioxide employed in accordance with this invention may be readily prepared by mixing 3,7-diaminodibenzothiophenedioxide with, for each mole thereof, the theoretical two moles of sulfuric acid, although in practice it is usual to employ an excess of sulfuric acid, up to about 0.5 mole thereof. Use of less than the theoretical two moles of sulfuric acid would be expected to decrease the disulfate:monosulfate salt ratio, which is desirable for some other purposes.

The admixture of the 3,7-diaminodibenzothiophenedioxide and sulfuric acid to form the di-sulfate salt may, if desired, be carried out in the presence of water to facilitate salt formation; a slurry of the salt in dilute acid results. The water, whether the amount used is large or small, is removed from the product by drying the disulfate salt of 3,7-diaminodibenzothiophenedioxide, during or before the heat treatment employed in accordance with this invention. Preferably, sufficient water is employed to yield a fluid mixture or slurry.

While temperatures of from about 170 to 230° C. may be employed in the heating step of the process of this invention, it is preferred to heat the reaction mixture at a temperature of from about 185 to 200° C. The heating, or baking, is continued for from about 8 to 60 or more hours, i.e. until the desired sulfonation is effected and the mixture of 3,7-diaminodibenzothiophenedioxide mono- and disulfonic acids is produced. The mixture of the said mono- and disulfonic acids may be employed as such for conversion into brighteners, or the mixture may be separated into its components by first extracting the mixture with aqueous alkali. The aqueous alkaline solution of the mixture thus formed is acidified with a weak acid such as acetic acid, propionic acid or the like to remove the monosulfonic acid derivative from the mixture as a precipitate.

In the process of this invention, the ratio of 3,7-diaminodibenzothiophenedioxide monosulfonic acid to 3,7-diaminodibenzothiophenedioxide disulfonic acid present in the mixtures thereof produced may be regulated and controlled by adjusting the amount of sulfuric acid, temperatures and time of baking within the ranges given above.

The following example is illustrative of a preferred embodiment of the instant invention and is not to be considered in any way limitative thereof.

Example

A slurry of 24.6 parts by weight of 3,7-diaminodibenzothiophenedioxide (0.1 mole) with 200 parts by weight of water and 24.5 parts by weight of 100% sulfuric acid (0.25 mole) is dried and then heated to 185-200° C. for 2 days. The baked product is extracted with 25 parts caustic soda solution (9 parts NaOH in 25 parts water) and filtered. It is then acidified with acetic acid whereby the monosulfonic acid is precipitated. After filtering the monosulfonic acid the filtrate is acidified with 300 parts of aqueous hydrochloric acid solution (30% HCl) which precipitates the disulfonic acid.

It is to be understood that the foregoing detailed description is given merely by way of illustration and that many variations may be made therein without departing from the spirit of my invention.

Having described my invention what I desire to secure by Letters Patent is:

1. The process which comprises forming an aqueous composition containing 3,7-diaminodibenzothiophenedioxide and, for each mole thereof, 2.5 moles of sulfuric acid, drying said composition, and then heating said dried composition at a temperature of about 170 to 230° C. for from 8 to 60 hours so as to produce a mixture of 3,7-diaminodibenzothiophenedioxide mono- and disulfonic acids of polysulfonic acids.

2. The process which comprises forming an aqueous composition containing 3,7-diaminodibenzothiophenedioxide and, for each mole thereof, 2.5 moles of 100% sulfuric acid, drying said composition, and then heating said dried composition at a temperature of 185 to 200° C. for amout 48 hours so as to produce a mixture of 3,7-diaminodibenzothiophenedioxide mono- and disulfonic acids free of polysulfonic acids.

3. The process which comprises mixing 3,7-diaminodibenzothiophenedioxide with, for each mole thereof, about 2.0 to 2.5 moles of sulfuric acid in the presence of water, drying the composition so formed, and then heating said dried composition at a temperature of about 170 to 230° C. for from 8 to 60 hours so as to produce a mixture of 3,7-diaminodibenzothiophenedioxide mono- and disulfonic acids free of polysulfonic acids.

4. The process which comprises mixing 3,7-diaminodibenzothiophenedioxide and, for each mole thereof, 2.5 moles of sulfuric acid in the presence of water, drying the composition so formed, and then heating said dried composition at a temperature of 185 to 200° C. for 48 hours so as to produce a mixture of 3,7-diaminodibenzothiophenedioxide mono- and disulfonic acids free of polysulfonic acids.

5. The process which comprises mixing 3,7-diaminodibenzothiophenedioxide and, for each mole thereof, 2.5 moles of sulfuric acid in the presence of water, drying the composition so formed, then heating said dried composition at a temperature of 185 to 200° C. for 48 hours so as to produce a mixture of 3,7-diaminodibenzothiophenedioxide mono- and disulfonic acids free of polysulfonic acids and then separating 3,7-diaminodibenzothiophenedioxide monosulfonic acid from said mixture containing the same.

References Cited in the file of this patent

UNITED STATES PATENTS

| | | |
|---|---|---|
| 2,563,493 | Scalera | Aug. 7, 1951 |
| 2,590,632 | Long | Mar. 25, 1952 |
| 2,620,343 | Tsang | Dec. 2, 1952 |

OTHER REFERENCES

Griggins: "Unit Processes in Org. Synthesis," 4th Ed. (1952), pp. 276, 329 and 330.